Patented Apr. 17, 1951

2,548,865

UNITED STATES PATENT OFFICE 2,548,865

FROZEN CONFECTIONS

Leland H. Burt, Philadelphia, Pa., assignor to Hercules Powder Company, Wilmington, Del., a corporation of Delaware No Drawing. Application January 8, 1945, Serial No. 571,950

5 Claims. (Cl. 99—136)

This invention relates to improvements in frozen food products and methods of making the same. More particularly, it relates to improved ice creams, sherbets, and ices and to their preparation.

A serious problem in the manufacture of ice creams, sherbets, ices, and other frozen confections lies in obtaining and maintaining a uniform, smooth texture. Various additives intended to control the texture, the size of ice crystals, and other characteristics of frozen confections and of the mixes from which they are made, have been proposed and used. At present, nearly 90% of ice creams, sherbets, and ices contain gelatin or an alginate as an additive or stabilizer.

However, the alginates have certain inherent disadvantages as stabilizers: They must be added to a hot mix, since addition to cold mix causes their precipitation. Furthermore, the compositions containing alginates are comparatively thick and hence require relatively long cooling periods. Gelatin likewise has certain inherent shortcomings: An aging or wetting-out period is required in order to give the gelatin granules time to swell, absorb water, and eventually dissolve. In addition, gelatin-stabilized mixes require relatively long whipping periods to reach the desired over-run.

In accordance with this invention, ice cream, sherbets, ices, and other frozen confections having a desirably smooth texture, both initially and upon aging, are prepared without encountering the disadvantages mentioned by incorporating between about 0.01% and 0.5% by weight of a water-soluble carboxymethylcellulose or equivalent carboxyalkyl carbohydrate in the confection mix prior to freezing. The carboxymethylcellulose may be dissolved in the mix or added thereto in solution or paste form. Conveniently, the addition is made at or prior to the time of pasteurization of the mix and the mix is then pasteurized, cooled, whipped, and frozen, or otherwise processed.

The examples which follow illustrate the invention (all quantities are by weight):

Example I

Ice cream containing the following specified components was prepared:

| | Per cent by weight |
|---|---|
| Fats (cream) | 11.00 |
| Serum solids (dried skim milk) | 8.80 |
| Sugar | 15.00 |
| Sodium salt of carboxymethylcellulose | 0.15 |
| Water | 65.05 |

A series of seven 3000 lb. mixes was prepared.

The ingredients (i. e. cream, dried skim milk, water, sugar, and stabilizer) were mixed in a pasteurizer and then pasteurized while being stirred at high speed for about 30 minutes at about 155° F. The hot pasteurized mix was then homogenized in a two-stage homogenizer at about 2000 lb. pressure. Following homogenization, the mix was cooled as rapidly as possible to 42–44° F. and subsequently placed in a holding tank where the mix was cooled to about 34° F. After flavoring, the mixture was frozen while being whipped, freezer temperatures varying between about —13 and —18° F. The ice cream when removed from the freezer had a temperature of about 26° F. The ice cream was then placed in a hardening room at about —15° F. for a period of 16 hours. Data obtained during these operations are given in Table 1.

Table 1

| Mix No. | Temp. of Cooled Mix °F. | Refrigerator Temp. °F. | Time to Freeze | Total Time for 85% Overrun |
|---|---|---|---|---|
| 1 | 44 | —14 | 3' 3'' | 5'12'' |
| 2 | 43 | —15 | 3'18'' | 5'17'' |
| 3 | 42 | —18 | 3'10'' | 5'12'' |
| 4 | 44 | —16 | 3'12'' | 5' 8'' |
| 5 | 43 | —15 | 3'18'' | 5'22'' |
| 6 | 44 | —13 | 3'20'' | 5'14'' |
| 7 | 44 | —15 | 3'22'' | 5'19'' |

For comparison, several mixes were prepared using gelatin as the stabilizer. The gelatin was used in the quantity necessary to give an ice cream of a consistency similar to that of the carboxymethylcellulose-stabilized ice cream. These are detailed below:

Ice cream was prepared containing the following ingredients:

| | Per cent by weight |
|---|---|
| Fats (cream) | 11.00 |
| Serum solids (dried skim milk) | 8.80 |
| Sugar | 15.00 |
| Gelatin (250 Bloom) | 0.43 |
| Water | 64.77 |

Manufacturing procedure duplicated that used in preparing the carboxymethylcellulose stabilized ice creams detailed in Example I. Data obtained during the various steps are given in Table 2.

Table 2

| Mix No. | Temp. of Cooled Mix °F. | Refrigerator Temp. °F. | Time to Freeze | Total Time for 85% Overrun |
|---|---|---|---|---|
| 8 | 42 | —16 | 3'51'' | 7'23'' |
| 9 | 43 | —17 | 3'58'' | 7'41'' |

EXAMPLE II

Sherbets were prepared containing 25% sugar, 5% dry skim milk, flavoring, citric acid, about 69% water, and stabilizer in the amounts indicated in Table 3. For comparison of the stabilizing effects of carboxymethylcellulose and gelatin in sherbets, two 3000 lb. batches were prepared, using gelatin in one case and sodium carboxymethylcellulose in the other. The procedure followed in preparing the sherbets followed that given in Example I. The data obtained during these steps are given in Table 3.

*Table 3*

| Stabilizer | Per Cent Stabilizer (by Weight) | Refrigerator Temp. | Time to Freeze | Total Time for Overrun |
|---|---|---|---|---|
| | | °F. | | |
| Gelatin | 0.5 | −14 | 4′ 0″ | 5′ 0″ |
| Sodium salt of Carboxymethylcellulose | 0.2 | −14 | 4′ 0″ | 4′ 30″ |

EXAMPLE III

Ices were prepared containing 30% sugar, flavoring, citric acid, stabilizer, and water. The method of preparation followed that given in Example I. The data obtained during these steps are given in Table 4.

*Table 4*

| Stabilizer | Per Cent Stabilizer (by Weight) | Refrigerator Temp. | Time to Freeze | Total Time for Overrun |
|---|---|---|---|---|
| | | °F. | | |
| Gelatin | 0.5 | −15 | 4′ 10″ | 5′ 15″ |
| Sodium salt of Carboxymethylcellulose | 0.2 | −15 | 4′ 5″ | 4′ 25″ |

Any nontoxic water-soluble carboxymethylcellulose may be used instead of or combined with the sodium derivative employed in the examples. Thus, all the alkali metal salts and ammonium salts have been found to be suitable. In addition to the freely water-soluble varieties, water-dispersible forms of carboxymethylcellulose, such as, for example, a water-dispersed calcium or magnesium salt or the water-dispersible free acid carboxymethylcellulose have also been found to be suitable.

In addition to the water-soluble or water-colloidable salts of carboxymethylcellulose, other nontoxic hydrophilic carboxyalkyl carbohydrates may be used in carrying out the present invention. These include, for example, the nontoxic hydrophilic carboxy ethers of celluloses, dextrins, starches, conjugated carbohydrates, the various sugars, and the like. The carboxyalkyl group may be derived from the various alkyl radicals such as methyl, ethyl, propyl, etc.

The sodium salt of carboxymethylcellulose used in the examples had a substitution of about 0.7–0.8 and a viscosity of approximately 1500 centipoises in 1% water solution at 25° C. However, the substitution and viscosity of the carboxy ether does not affect its efficiency as a stabilizer. Thus, water-soluble carboxymethylcellulose varying in substitution between 0.2 and 1.7 may be employed, but substitutions between about 0.6 and about 0.9 are preferred. Viscosities varying from about 10 centipoises in 2% water solution to about 4000 centipoises in 1% water solution have been found to be suitable for stabilization, but the ethers having viscosities above about 100 centipoises in 2% solution are preferred.

The concentration of water-soluble carboxymethylcellulose required for imparting the desired texture and the desired stabilization is quite restricted; below about 0.01% concentration, for example, stabilizing action is not sufficiently effective and amounts above about 0.5% cause the product to become somewhat heavy or soggy. Furthermore, with the addition of more than 0.5% carboxymethylcellulose to the mix, it would be impractical to process the ice cream because of the fact that, upon cooling, it would become too thick to handle. For ice creams, a concentration range between about 0.1 and about 0.3% is preferred; sherbets and ices respond best when between about 0.1 and about 0.2% is employed.

The stabilizing action of water-soluble carboxymethylcellulose is not substantially affected by normal variations in the composition of the usual ice creams. Ice cream made in accordance with this invention usually may, for example, vary in composition within the following limits:

| | Percent by weight |
|---|---|
| Fats | 8–25 |
| Serum solids | 8–12 |
| Sugar | 13–18 |
| Carboxymethylcellulose | 0.01–.5 |

Eggs may also be included in ice cream or frozen custard, which is regarded herein as a form of ice cream. However, egg powder, which is sometimes added to promote better whipping, has been found unnecessary when water-soluble carboxymethylcellulose is employed.

Sherbets usually contain 5% milk solids, 25% sugar, an acid such as citric acid, and up to 0.5% stabilizer, while ices ordinarily contain about 30% sugar, an acid, and up to 0.5% stabilizer. Flavoring, coloring, fruit, and so forth are also added in any desired amounts.

The water-soluble carboxymethylcellulose may be modified as stabilizers by addition of such substances as phosphates, carbonates, citrates, lactates, or another stabilizer.

No operating difficulties or special requirements are introduced into the methods by which the frozen confections may be made by the use of carboxymethylcellulose stabilizers. Hence, pasteurization temperatures may vary within the commercial and legally imposed range of 145° F. to about 180° F. Homogenization may be carried out with any type of equipment, such as 1, 2, or 3 stage. Freezing and whipping may be carried out concurrently and in separate stages; preferably the mix is cooled before whipping and whipping is continued at least during the early stages of freezing. Hardening room time is immaterial after the ice cream has reached the minimum temperature there attained. Considerable variation in manufacturing detail is obviously possible.

The method of adding a water-soluble carboxymethylcellulose to an ice cream mix or similar confection is subject to considerable variation as stated hereinbefore; the normal time of adding a stabilizer is during mixing prior to pasteurization. The carboxymethylcellulose may be added as a powder either alone or mixed with at least part of the sugar, or as a solution.

It is preferred technique to fill the mix tank about one-quarter full of one of the liquid ingredients of the mix and add the stabilizer while mixing. The agitation is more vigorous at this stage than when the tank is more nearly full; hence, complete dispersion is easily effected.

Water-soluble carboxymethylcellulose and the equivalent substances as defined herein are superior to previously known stabilizers in the versatility which they allow in temperature during addition; in their superior wetting-out properties;

in the desirable fluid body which they impart to the mix, thus allowing ready heat transfer; in the reduced whipping time which they allow; and in the reduced freezing time which their use permits.

The water-soluble carboxymethylcelluloses as referred to in the specification and claims have been defined hereinbefore. These substances are also known as cellulose glycolates. For example, sodium carboxymethylcellulose is also known as sodium cellulose glycolate. The equivalent carboxyalkyl carbohydrates have also been defined hereinbefore. Frozen confections which respond to stabilization by the water-soluble carboxymethylcelluloses include ice creams, sherbets, ices, frozen custards, and allied products. By overrun is meant the increase in volume caused by whipping.

The term "serum solids" is used herein as in the ice cream industry and refers to the non-fatty solid constituents of milk. Percentages discussed throughout the specification and in claims will be understood to mean "percent by weight."

What I claim and desire to protect by Letters Patent is:

1. A frozen confection composition comprising confection ingredients, a water-colloidable carboxyalkyl carbohydrate and water, said carboxyalkyl carbohydrate being present in an amount between about 0.01% and about 0.5% by weight, said composition being characterized by a reduction in whipping time to produce the desired overrun during manufacture into a frozen confection and possessing improved body and texture properties as a frozen confection.

2. A frozen confection composition comprising not more than about 55% by weight of confection ingredients, a water-soluble carboxymethylcellulose and water, said carboxymethylcellulose being present in an amount between about 0.01% and about 0.5% by weight, said composition being characterized by a reduction in whipping time to produce the desired overrun during manufacture into a frozen confection and possessing improved body and texture properties as a frozen confection.

3. A frozen confection composition comprising not more than about 55% by weight of ice cream ingredients, a water-soluble carboxymethylcellulose having a viscosity greater than about 100 cps. in 2% aqueous solution at 25° C. and water, said carboxymethylcellulose being present in an amount between about 0.01% and about 0.5% by weight, said composition being characterized by a reduction in whipping time to produce the desired overrun during manufacture into a frozen confection and possessing improved body and texture properties as a frozen confection.

4. A frozen confection composition comprising not more than about 55% by weight of sherbet ingredients, a water-soluble carboxymethylcellulose having a viscosity greater than about 100 cps. in 2% aqueous solution at 25° C. and water, said carboxymethylcellulose being present in an amount between about 0.01% and about 0.5% by weight, said composition being characterized by a reduction in whipping time to produce the desired overrun during manufacture into a frozen confection and possessing improved body and texture properties as a frozen confection.

5. A frozen confection composition comprising not more than about 55% by weight of flavored ice ingredients, a water-soluble carboxymethylcellulose having a viscosity greater than about 100 cps. in 2% aqueous solution at 25° C. and water, said carboxymethylcellulose being present in an amount between about 0.01% and about 0.5% by weight, said composition being characterized by a reduction in whipping time to produce the desired overrun during manufacture into a frozen confection and possessing improved body and texture properties as a frozen confection.

LELAND H. BURT.

REFERENCES CITED

The following references are of record in the file of this patent:

UNITED STATES PATENTS

| Number | Name | Date |
| --- | --- | --- |
| 2,179,457 | Voss | Nov. 7, 1939 |
| 2,202,741 | Maxwell | May 28, 1940 |
| 2,302,511 | Wallach | Nov. 17, 1942 |
| 2,355,547 | Musher | Aug. 8, 1944 |
| 2,393,561 | Perech | Jan. 22, 1946 |

OTHER REFERENCES

"Sodium Carboxymethylcellulose"; published by Hercules Powder Co., Wilmington, Del., Form No. 500-18-A, 2M, 6-44 published June 1944, pages 1 to 4.

Rayon Textile Monthly (New York) vol. 25, page 207, April 1944.

Chemical and Metallurgical Engineering; March 1944, pages 139 and 140, "Sodium Cellulose Glycollate."

Southern Dairy Products Journal; vol. 13, p. 103, April 1943, "A Comparison of Some Ice Cream Stabilizers," by Josephson et al.

Industrial and Engineering Chemistry, September 1937, page 985.

Journal Soc. Chem. Ind., vol. 60, pp. 254–258, pub. 1941.

Chemical Abstracts 36: 1941;—(1942).

American Professional Pharmacist, vol. 5, No. 12, December 1939, pp. 691–694.

Ice Cream Trade Journal, March 1936, pp. 31, 32. "The Use of Stabilizing Agents in Manufacturing Ice Cream," by R. H. Tracy.